United States Patent [19]

Walker-Arnott

[11] E Re. 29,406

[45] Reissued Sept. 20, 1977

[54] DOCUMENT ORIGINAL HANDLING SYSTEM

[75] Inventor: David Athelton Walker-Arnott, Bletchley, England

[73] Assignee: Xerox Corporation, Stamford, Conn.

[21] Appl. No.: 706,029

[22] Filed: July 16, 1976

Related U.S. Patent Documents

Reissue of:

[64] Patent No.: 3,953,122
Issued: Apr. 27, 1976
Appl. No.: 526,560
Filed: Nov. 25, 1974

[30] Foreign Application Priority Data

Dec. 21, 1973 United Kingdom ..... 59528/73

[51] Int. Cl.[2] ..... G03G 15/00
[52] U.S. Cl. ..... 355/12; 355/75
[58] Field of Search ..... 355/12, 3 R, 11, 75, 355/97, 99, 102-104, 109; 271/275

[56] References Cited

U.S. PATENT DOCUMENTS

| | | | |
|---|---|---|---|
| 2,357,809 | 9/1944 | Carlson | 355/3 R |
| 2,822,172 | 2/1958 | Mayo et al. | 271/74 |
| 2,948,207 | 8/1960 | Amsel et al. | 355/96 |
| 3,396,645 | 8/1968 | Macklem | 355/12 |
| 3,536,320 | 10/1970 | Derby | 271/50 |
| 3,544,212 | 12/1970 | Umahashi et al. | 355/75 |

*Primary Examiner*—Richard L. Moses
*Attorney, Agent, or Firm*—James J. Ralabate; Michael H. Shanahan; Paul Weinstein

[57] ABSTRACT

A reproducing machine including a device for forming an image of information on an original document and a device for transporting the document past the imaging device. The transport device comprises a strip member. The strip member supports the documents and moves past the imaging device to present the documents for forming an image thereof. The strip member may have a plurality of original document receiving pockets.

21 Claims, 2 Drawing Figures

DOCUMENT ORIGINAL HANDLING SYSTEM

Figure 1:
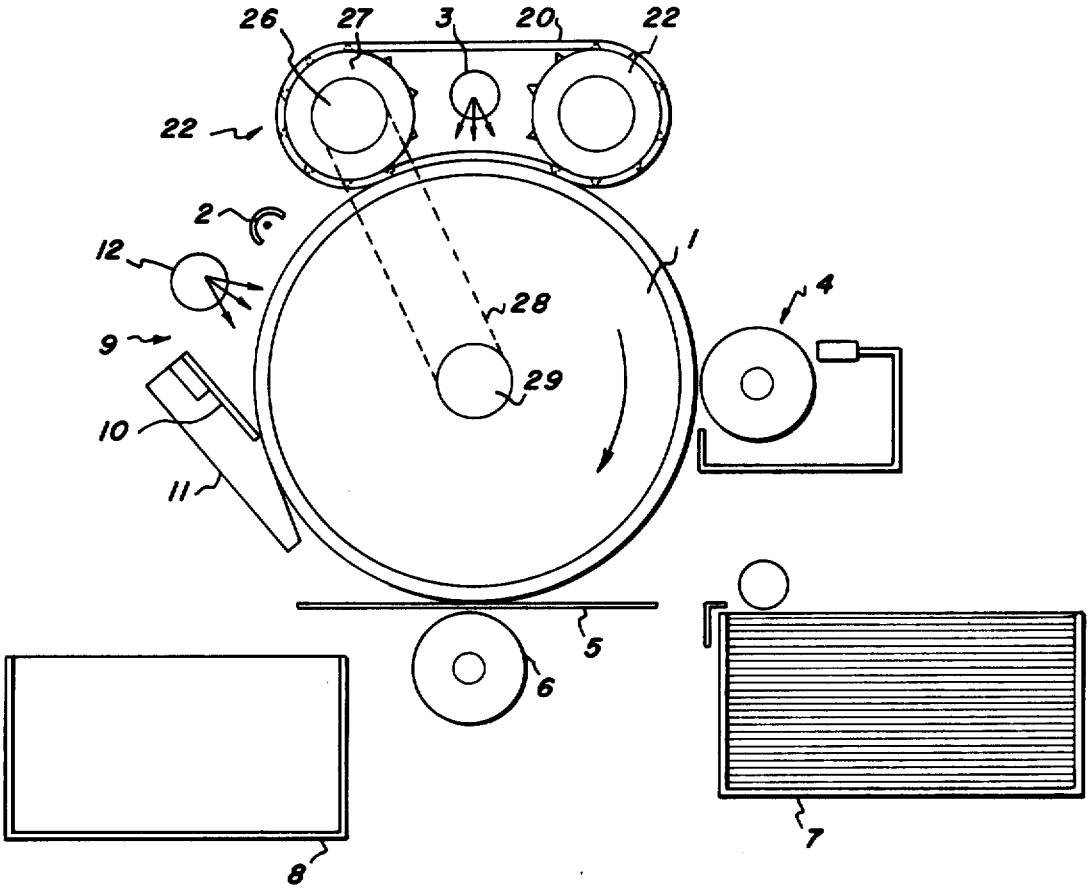

Matter enclosed in heavy brackets [ ] appears in the original patent but forms no part of this reissue specification; matter printed in italics indicates the additions made by reissue.

This invention relates to apparatus for handling sheets or the like carrying information to be reproduced. For convenience such sheets or the like are hereinafter and in the claims referred to as originals, although it is to be understood that these may themselves be copies, and bundles of such originals are referred to as documents. More particularly, the invention is concerned with original handling apparatus for use in photocopying machines, particularly electrostatographic copying machines.

It has heretofore been proposed to feed originals to an imaging station seriatim from a stack. For example, in our U.S. Pat. No. 3,630,515, there is described a recirculating original handling system in which originals are fed seriatim from a supply tray to an imaging station and returned to the supply for either recycling or removal. The system includes a feeder for feeding one original at a time from the bottom of the supply to the imaging station and back to the tray, and a bar to segregate originals returning to the tray from other originals awaiting feeding, at least until the supply of other originals is used up. Such apparatus may be programmed to precollate the copies by repetitively feeding the originals in sequence and making one copy of each original at a time. Or it may be used in conjunction with a sorter in which case multiple copies limited only by the capacity of the sorter may be made of each original before the next one is fed, i.e., post-collation.

Documents which are to be duplicated very often consist of only a few pages, e.g., reports have frequently no more than five pages. It is an object of the present invention to provide an apparatus for handling originals which is relatively unsophisticated compared with the apparatus described above yet enables pre-collation of the copies from a limited number of originals.

To this end the invention consists in a photocopying machine including an original illumination station, an original handling apparatus comprising an endless belt having a plurality of original receiving pockets and means for driving said belt passed said original illumination station.

The photosensitive surface of a photocopying machine may be exposed to a light pattern of an image of the information on an original to be reproduced by scanning a stationary original using a moving illumination source and a moving optical system or by moving the original passed a stationary illumination source and optical system. A third method is to use flash exposure where both the light source and the original are stationary during the exposure step. Apparatus of this invention may be utilized in machines employing any of these exposure methods and accordingly the belt drive means may be arranged to drive the belt continuously or stepwise.

The invention is particularly suitable for use in photocopying machines employing so called contact exposure in which the original is fed between a stationary illumination source and a moving photosensitive surface, the original being moved in synchronism with the surface and face down to the surface and an image of the information on the original being obtained by illumination through the sheet or the like on which it is supported. In order to protect the original it is usually contained in a transparent envelope. For such use both sides the pockets of a belt of this invention must be transparent (which term as used herein and in the claims includes translucent). Where the image is obtained by reflecting light from the original, only one side of the pocket need be transparent.

Where the photosensitive surface and the original are to be moved synchronously during the exposure step, the photosensitive surface is generally on a drum or the like and in such case the belt is preferably driven by a drive taken from the drum or the like.

Figure 2:
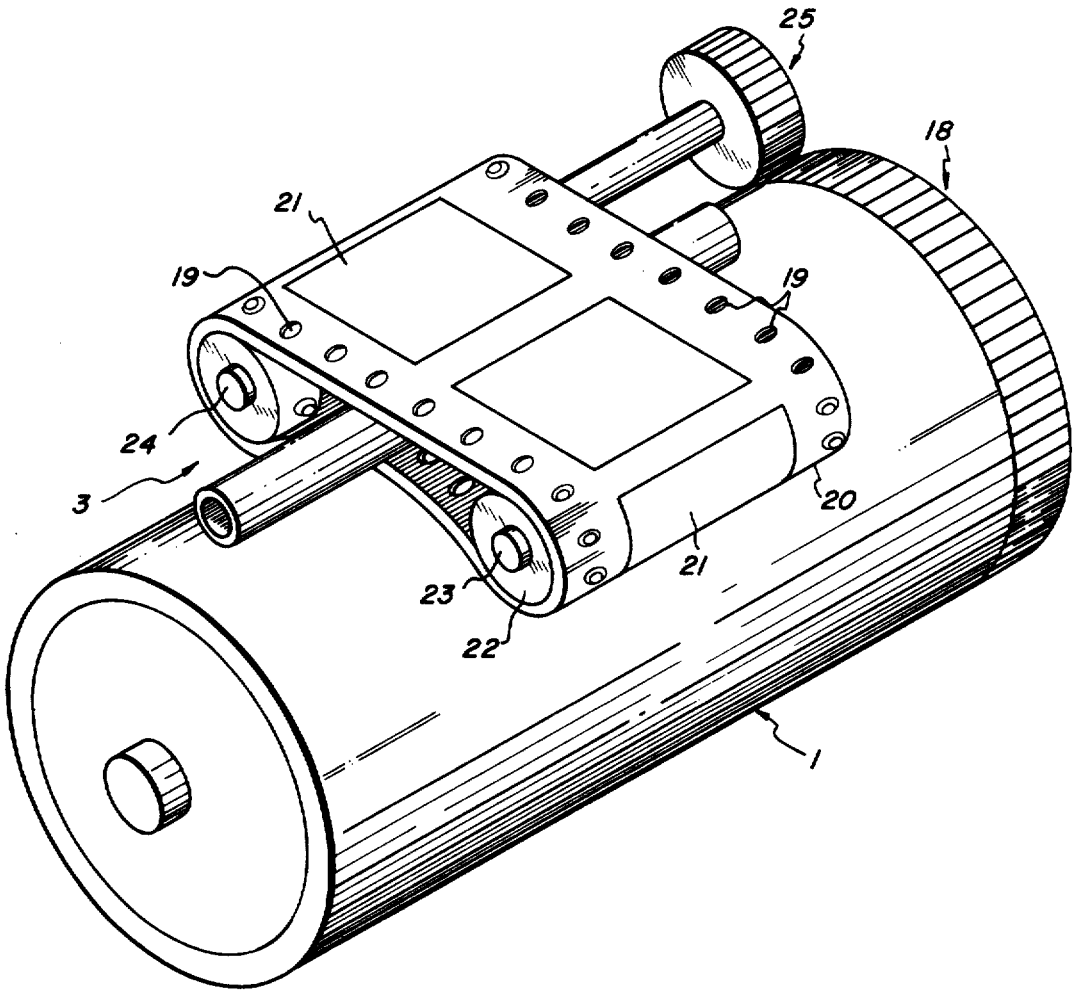

In order that the invention may be more readily understood, reference will now be made to the accompanying drawings, in which:

FIG. 1 is a schematic side elevation of one embodiment of electrostatographic copying machine according to this invention, and FIG. 2 is a partial perspective view of the embodiment of FIG. 1.

Referring to the drawings, the general operation of an electrostatographic machine as illustrated will first be described with reference to FIG. 1. A moving photoconductive plate, in this instance having an endless surface constituting the periphery of a drum 1, is first uniformly charged at a charging station 2 and the surface then exposed at an exposure station represented by a lamp 3 to a light pattern of the image sought to be reproduced thereby to discharge the charge in the areas where light strikes the plate surface. The undischarged areas of the surface thus form an electrostatic charge pattern in conformity with the configuration of the original image pattern. The embodiment illustrated employs contact exposure in which the original is driven past the exposure station, face down to the drum and synchronously with the latter.

The electrostatic latent image is then developed into visible form by the development system 4 which in this embodiment is a liquid development system employing the techniques described in U.S. Pat. No. 3,084,043 granted Apr. 2, 1963, and schematically represented by an applicator roll of such a system. As described in that patent the liquid developer is applied to the photoreceptor by an applicator in the form of a roll having a peripheral surface comprising lands and valleys such that the liquid developer is contained in the valleys such that the liquid developer is contained in the valleys out of contact with the photoreceptor, while the surfaces of the lands are in contact with the photoreceptor. In such an arrangement, the liquid developer is attracted from the valleys to the electrostatic latent image in image configuration. The illustrated embodiment exemplifies a typical example of such an arrangement in which the applicator is a rigid cylindrical member having on its surface a pattern of grooves and ridges which comprise the lands and valleys respectively, the liquid developer being maintained in the valleys below the surface of the lands.

As the photoreceptor surface bearing the electrostatic latent image and the applicator are brought into moving contact the liquid developer is drawn to the photoreceptor from the valleys of the applicator roll by the charges which form the electrostatic latent image.

The development system of the illustrated embodiment may be constructed as desired.

Subsequent to the development operation the now visible image is transferred from the plate to a sheet of final support material 5, such as paper or the like, thereby to form a permanent print, at a transfer station schematically illustrated by a transfer roll 6. The paper is suitably supplied using known techniques from a supply tray 7 and the copies produced collected in a bin or tray 8.

Following transfer, the drum surface is cleaned of residual developer material at cleaning station 9 suitably by means of a blade 10 arranged at a leading angle to the direction of drum rotation and collected in a sump 11 for subsequent disposal. The drum surface is finally illuminated at 12 to remove any remaining charge therefrom.

Referring to FIGS. 1 and 2, the original handling apparatus of this invention comprises an endless belt 20, formed for example by seaming together the ends of a strip, having a plurality of axially spaced original pockets 21 along its length on its exterior face. The belt is of transparent plastics material and the pockets are formed by welding sheets of plastics material to the belt along three edges thereof leaving an opening for the insertion and removal of originals to be copied. Suitable plastics materials are polyvinylchloride and a polyester, e.g., Mylar. The belt extends over two pairs of sprockets 22 mounted on axles 23, 24, and the belt has sprocket holes 19 accurately punched or otherwise formed along the side edges thereof. In order to ensure that the movement of the belt 20 is synchronized with that of the drum 1, the belt is driven directly from the drum. To this end, the axle 24 carries at one end a gear 25 which meshes with a drive gear 18 on the end of the drum 1 (FIG. 2).

The axles 23, 24, are suitably relatively adjustable for loading and unloading of the belt to permit the use of belts having differing numbers and/or sizes of pockets. Or cassette loading of different belts may be employed. Such a cassette may comprise a housing or frame supporting a belt mounted on the sprockets 22. In the case of cassette loading, the drive suitably comprises a spindle 26 onto which one of the sprocket pairs is loaded and which carries a pulley 27 driven via a belt 28 from a pulley 29 on the spindle of the drum 1 (FIG. 1).

In operation, the pages of a document to be copied are loaded into the pockets 21 either before loading of the belt into the apparatus or while it is in position on the sprockets 22 in which case means should be provided to disengage the sprockets from the drive thereby to allow them to freewheel during loading of the originals. The copying machine is then started up and operates in the manner generally described above, each pocket being repeatedly driven passed the exposure station 3. In this way, the copies will be produced serially in the correct order, i.e., pre-collated.

It will be appreciated that various modifications may be made to the specific details referred to herein without departing from the scope of the invention as defined in the appended claims.

What is claimed is:

1. In a reproducing machine including means for forming an image of information on an original and means for transporting said original past said imaging means the improvement wherein, said transport means comprises:

a strip member having a plurality of original receiving pockets and means for moving said member past said imaging means with said pockets arranged to present said originals to said imaging means for forming said image.

2. A machine as in claim 1, wherein said strip member is replaceably mounted.

3. A machine as in claim 1, wherein said strip member is supported in a removable cassette.

4. A machine as in claim 1, wherein said pockets are formed of a transparent material.

5. A machine as in claim 1, wherein said machine comprises an electrostatographic copying machine and wherein said imaging means comprises an imaging surface arranged for movement, means for forming an electrostatic image on said moving imaging surface, and further including means for developing said electrostatic image and means for transferring said developed image to a sheet of final support material.

6. A machine as in claim 5, further including means for synchronizing the movement of said strip member with the movement of said imaging surface, and further wherein said imaging surface comprises a photoconductive imaging surface whereby said documents can be serially presented to said imaging means.

7. A machine as in claim 6, wherein said imaging means includes contact exposure means, and wherein said pockets are spaced apart along said strip in the direction of its movement.

8. A reproducing machine as in claim 1, wherein said strip member comprises an endless belt.

9. A machine as in claim 8, wherein said belt member is replaceably mounted.

10. A machine as in claim 8, wherein said belt member is supported in a removable cassette.

11. A machine as in claim 8, wherein said belt member is formed of a transparent material.

12. A machine as in claim 8, wherein said machine comprises an electrostatographic copying machine and wherein said imaging means comprises an imaging surface arranged for movement, means for forming an electrostatic image on said moving imaging surface, and further including means for developing said electrostatic image and means for transferring said developed image to a sheet of final support material.

13. A machine as in claim 12, further including means for synchronizing the movement of said strip member with the movement of said imaging surface, and further wherein said imaging surface comprises a photoconductive imaging surface, whereby said documents can be serially recirculated past said imaging means.

14. A machine as in claim 13, wherein said imaging means includes contact exposure means, and wherein said pockets are spaced apart along said strip in the direction of its movement.

15. In a reproducing machine including means for forming an image of information on an original, said imaging means including a curved imaging surface, and means for transporting said original past said imaging surface, the improvement wherein, said transport means comprises: a strip member having a plurality of original receiving pockets and means for moving said member and originals supported in said pockets past said imaging means to present said originals to said imaging means for forming said image, and wherein said strip member is deflected about said imaging surface to form a curved nip therebetween

16. A machine as in claim 15, wherein said strip member is formed of a transparent material and further including means positioned behind said strip member for illuminating said originals through said strip member at said nip.

17. A machine as in claim 16, wherein said strip member is replaceably mounted.

18. A machine as in claim 16, wherein said strip member is supported in a removable cassette.

19. A machine as in claim 16, further including means for synchronizing the movement of said strip member with the movement of said imaging surface, and further wherein said imaging surface comprises a photoconductive imaging surface whereby said original can be serially presented to said imaging means.

20. A reproducing machine as in claim 19, wherein said strip member comprises and endless belt.

21. A machine as in claim 19, wherein said machine comprises an electrostatographic copying machine and wherein said imaging means comprises an imaging surface arranged for movement, means for forming an electrostatic image on said imaging surface, and further including means for developing said electrostatic image and means for transferring said developed image to a sheet of final support material.

* * * * *